United States Patent [19]
Clarkson

[11] Patent Number: 5,564,115
[45] Date of Patent: Oct. 8, 1996

[54] NEURAL NETWORK ARCHITECTURE WITH CONNECTION POINTERS

[75] Inventor: Trevor G. Clarkson, London, United Kingdom

[73] Assignees: University College London; King's College London, both of London, England

[21] Appl. No.: 167,883

[22] PCT Filed: Jun. 16, 1992

[86] PCT No.: PCT/GB92/01077

§ 371 Date: Feb. 18, 1994

§ 102(e) Date: Feb. 18, 1994

[87] PCT Pub. No.: WO93/00653

PCT Pub. Date: Jan. 7, 1993

[30] Foreign Application Priority Data

Jun. 21, 1991 [GB] United Kingdom .................. 9113553

[51] Int. Cl.⁶ ........................................ G06F 15/18
[52] U.S. Cl. ................................ 395/27; 395/22; 395/20
[58] Field of Search ........................... 395/27, 22, 20

[56] References Cited

U.S. PATENT DOCUMENTS

| | | | |
|---|---|---|---|
| 4,989,256 | 1/1991 | Buckley | 395/27 |
| 5,063,521 | 11/1991 | Peterson et al. | 395/27 |
| 5,151,971 | 9/1992 | Jousselin et al. | 395/27 |
| 5,165,009 | 11/1992 | Watanabe et al. | 395/27 |
| 5,167,009 | 11/1992 | Skeirik | 395/22 |
| 5,175,798 | 12/1992 | Taylor et al. | 395/20 |
| 5,197,114 | 3/1993 | Skeirik | 395/22 |
| 5,293,459 | 3/1994 | Duranton et al. | 395/27 |

FOREIGN PATENT DOCUMENTS

0375054A1  6/1990  European Pat. Off. .

OTHER PUBLICATIONS

Yasunaga et al, "A Wafer Scale Integration Neural Network Utilizing Completely Digital Circuits", IJCNN, IEEE 1989.
Ventä et al, "A Content-Addressing Software Method for the Emulation of Neural Networks", ICNN, IEEE 1988.
Wittie et al, "Micronet: A Reconfigurable Microcomputer network for Distributed Systems Research", Nov. 1978.
Garth et al, "A Chip Set for High Speed Simulation of Neural Network Systems", IEEE 1st Int Conf. on Neural Networks, Jun. 1987.
Ghosh et al, "Critical Issues in Mapping Neural Networks on Message-Passing Multicomputers", IEEE The 15th Annual Inter. Symposium on Computers Architecture, May–Jun. 1988.
Wike et al, "The VLSI Implemetation of STONN", IEEE, IJCNN, Jun. 1990.
Clarkson et al, "PRAM Automata", IEEE Inter. workshop on Cellular Neural Network and their application, 16–19 Dec. 1990.
Clarkson et al, "Hardware Realisable Models of Neural Processing", IEE Artificial Neural Networks, 1989.
Chambers et al, "Hardware Realisable Models of Neural Processing" IEEE Inter. Conf. on Neural Networks, 1989.

Primary Examiner—George B. Davis
Attorney, Agent, or Firm—Darby & Darby, P.C.

[57] ABSTRACT

A neural network unit is described which has a plurality of neurons. The network comprises a RAM, which provides a plurality of storage locations for each of the neurons and an integrated circuit. The integrated circuit including means for defining an algorithm for the operation of the neurons and a control unit for causing the neurons to produce outputs on the basis of data stored in the storage locations and the algorithm. The integrated circuit may have a random number generator and a comparator. In effect, the neurons are virtual pRAMs (probabilistic RAMs).

9 Claims, 5 Drawing Sheets

NEURAL NETWORK ARCHITECTURE WITH CONNECTION POINTERS

BACKGROUND OF THE INVENTION

This invention relates to an architecture for use in constructing artificial neural networks. Such networks comprise a plurality of artificial neuron-like devices, hereinafter referred to simply, as "neurons". The invention is particularly intended for use with a particular type of neuron known as a pRAM, and by way of introduction a brief discussion is given below of the construction and operation of a pRAM. However, it must be understood that the invention is of general application to the architecture of neural networks, and is not restricted to those where the neurons are pRAMs.

One of the known ways of realising a neuron in practice is to use a random access memory (RAM). The use of RAMs for this purpose dates back a considerable number of years. It has been suggested that if one were able to construct a RAM in which a given output, say a '1', was produced by a given storage location with a probability between 0 and 1 (rather than with a probability of either 0 or 1 as in a conventional RAM), such a RAM would have a potential for constructing neural networks which mimicked more closely than hitherto the behaviour of physiological networks. (See Gorse, D., and Taylor, J. G., 1988, Phys. Lett. A. 131, 326–332; Gorse, D., and Taylor, J. G., 1989, Physica D, 34, 90–114) The term "pRAM", an abbreviation for "probabilistic RAM", is used there and herein for a RAM in which a given output is produced with a given probability between 0 and 1 when a particular storage location in the RAM in addressed, rather than with a probability of either 0 or 1 as in a conventional RAM.

In our copending International Patent Applications Nos. WO92/00572 and WO92/00573, and in a paper entitled "Hardware realisable models of neural processing", published in Proceedings of the First IEE International Conference on Artificial Neural Networks, 1989, pp 242–246 there is a description of how a pRAM may be constructed. There is described a device for use in a neural processing network, comprising a memory having a plurality of storage locations at each of which a number representing a probability is stored; means for selectively addressing each of the storage locations to cause the contents of the location to be read to an input of a comparator; a noise generator for inputting to the comparator a random number representing noise; and means for causing to appear at an output of the comparator an output signal having a first or second value depending on the values of the numbers received from the addressed storage location and the noise generator, the probability of the output signal having a given one of the first and second values being determined by the number at the addressed location.

One way in which a pRAM may be constructed is using a VLSI chip. However, such chips are relatively expensive, and it is presently impractical to fit more than one pRAM, or at most a few pRAMs, on to a single chip, given the substantial chip area which is required for the memory storage of each pRAM, its random number generator and the comparator. Neural networks of practical interest generally comprise a large number of neurons, so that using this approach a large number of VLSI chips would be required, with consequent high cost. The problem is accentuated when the neurons are provided with a learning capability, since that further increases the size of the neuron.

OBJECT AND SUMMARY OF THE INVENTION

It is an object of the present invention to provide an architecture which makes it possible to construct a neural network involving a substantial number of neurons, using VLSI chips, but in such a way as to reduce the cost significantly. The architecture of the present invention also has the potential for a high degree of flexibility in the connectivity of the neurons.

According to the present invention there is provided a neural network unit having a plurality of neurons, which network comprises a memory providing a plurality of storage locations for each of the neurons, and, in an integrated circuit, means for defining an algorithm for the operation of the neurons and a control unit for causing the neurons to produce outputs on the basis of data stored in the said storage locations and the said algorithm, the unit further comprising a connection pointers table defining which neuron outputs or external inputs are connected to which neuron inputs. Preferably the said integrated circuit is distinct from the said memory.

Preferably the integrated circuit further defines a learning algorithm by which the neurons can undergo a learning process. Preferably the integrated circuit contains an output list which holds the current outputs of the neurons, and a further output list which holds the previous outputs of the neurons and the previous outputs of the neurons in any other neural network units to which it may be connected. The output list could alternatively be in the said memory, though it is preferably in the said integrated circuit. The connection pointers table is held either on the said integrated circuit or in the said memory. Preferably the neural network unit has at least one expansion port, and more preferably a plurality of expansion ports, for example four such ports, permitting the unit to be connected to at least one, and preferably a plurality, of other such units.

In a preferred form of the invention the neurons are in the form of pRAMs. The means defining the neuron algorithm then preferably comprises a random number generator and a comparator for comparing the contents of addressed storage locations with random numbers produced by the random number generator.

DESCRIPTION OF THE PREFERRED EMBODIMENTS

Figure 1:
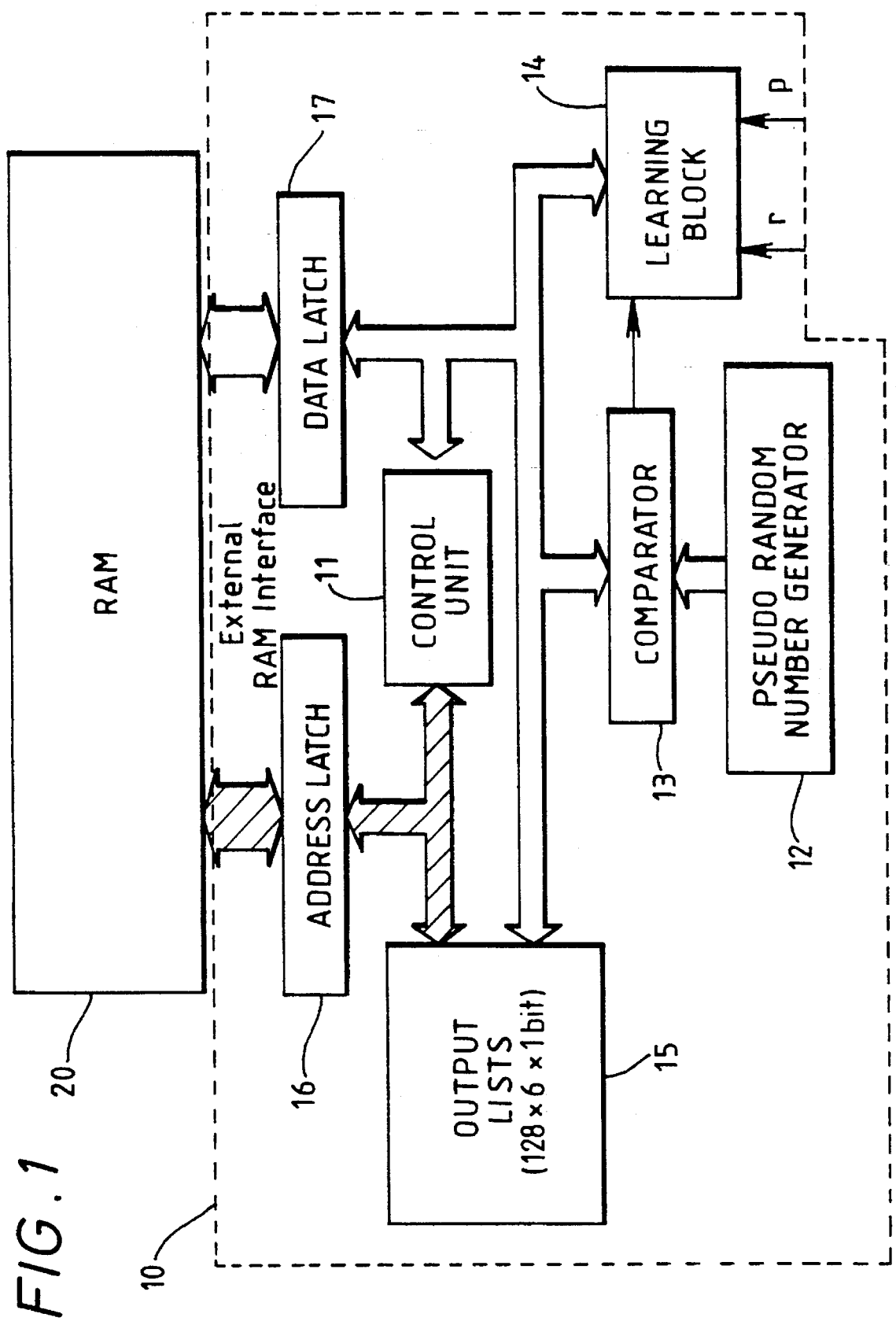
FIG. 1 shows an embodiment of the invention in block diagram form.
Figure 2:
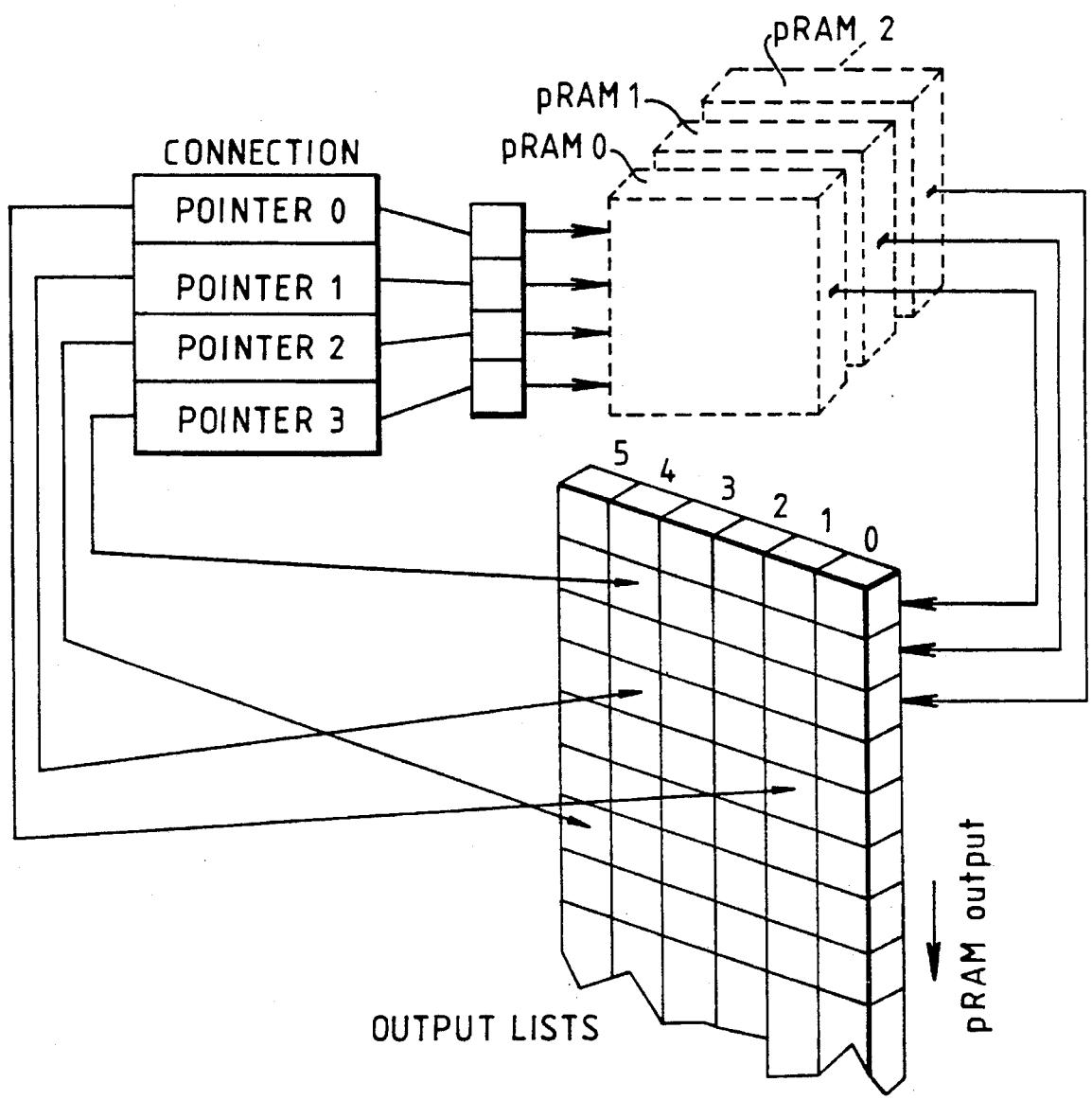
FIG. 2 shows in more detail some of the features of FIG. 1.

The embodiment which will now be described with reference to FIGS. 1 and 2 is a module which provides 128 pRAMs, though some other number, say 256, could be provided instead. The hardware for the module takes the form of a single VLSI chip and a conventional RAM, with appropriate connection between the two and provision for connection to other modules and/or to external inputs. The VLSI chip 10 comprises a control unit 11, a pseudo random number generator 12, a comparator 13, a learning block 14 with connections to receive reward and penalty signals r and p from the environment, a memory 15, and address and data latches 16 and 17 via which the chip 10 is connected to a RAM 20.

The pRAMs, of which three of the 128 are shown in FIG. 2, are shown in that Figure as though each were a discrete physical entity, but, as will be apparent from the ensuing description, each is in fact a virtual pRAM. The storage locations for all the pRAMs, are in the RAM 20, and the pseudo random number generator, comparator and learning block held on the VLSI serve successively as those components of each pRAM. FIG. 2 shows the pRAMs as being 4-pRAMs, i.e. pRAMs each of which has four address inputs and thus $2^4=16$ addresses. Although there is no particular significance in the pRAMs being 4-pRAMs it will be convenient below to refer to these by way of example.

Figure 3:
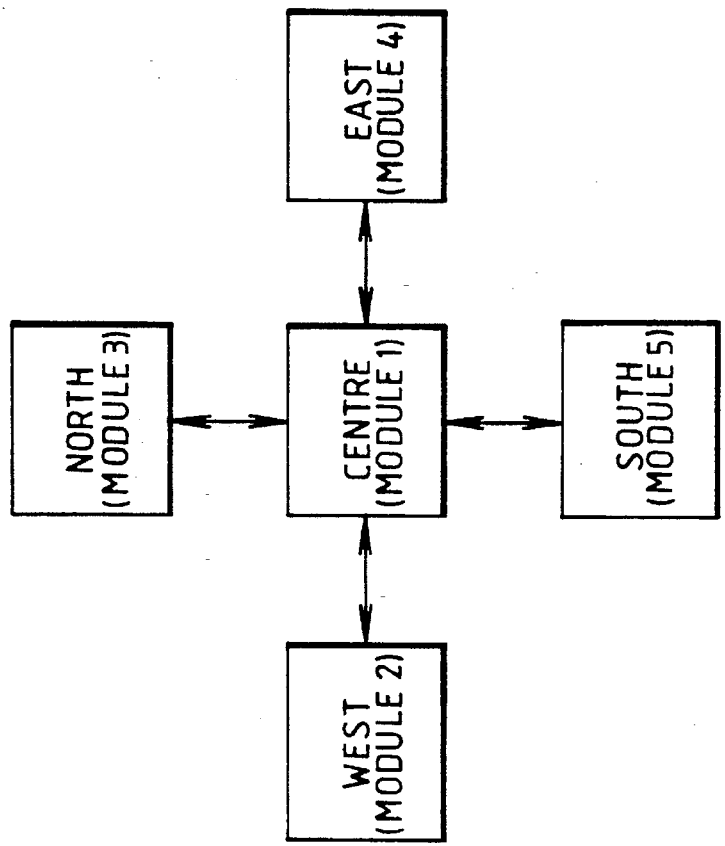
FIG. 3 shows how a number of modules according to the invention may be connected to one another.

The current output (0 or 1) of each pRAM is stored in column 0 of what is referred to here as an output list which is part of the VLSI memory 15. Column 1 of the output list holds the previous values of the outputs, and columns 2 to 5 hold the previous values of the outputs of four other modules 2 to 5 to which the module in question (regarded as module 1) is connected (see FIG. 3). The description of this embodiment is on the basis that the module in question is connected to four other modules, but it must be understood that it might be connected to a greater or lesser number of modules, or to no other modules. In the described embodiment the module has a single output port connected to all of its neighbours, and four serial input ports each connected to a respective neighbour.

The connectivity of each pRAM is specified by associating each of the four address inputs of the pRAM with a respective one of the four connection pointers 0 to 3. These pointers indicate from which pRAM in which module the input concerned is to be taken. Thus, in the illustrated example the connection pointers denote the fact that the inputs to the pRAM 0 are taken from pRAM 4 in module 1, pRAM 3 in module 4, pRAM 6 in module 5 and pRAM 1 in module 4, respectively. If it is intended that some of the inputs to the pRAMs should come from external sources, rather than from other pRAMs, the output list can contain a further column in addition to those shown.

In this example a connection pointer is a 10-bit binary number. To identify the number of the pRAM requires seven bits, and a further three bits are required to identify the module number. As far as the latter is concerned, 000 to 100 may be used for example to identify the module number, and 111, say, used to identify an external input.

Although reference is made above to an "output list" in the singular, it is more appropriate to think of there being two output lists, namely an "Old" output list (columns 1 to 5) which contain the outputs for the previous time step, and a "New" output list (column 0) which holds the current DRAM outputs as they are being generated. The way in which the old and new lists relate to one another will appear from what is said below.

The amount of VLSI memory required for each pRAM which shares it is very small, and can be made still smaller by shifting the table of connection pointers to the RAM. All the other requirements of the VLSI are substantially the same independent of the number of pRAMs, and in practice the number of pRAMs which can share a single VLSI chip is limited only by the update rate required (i.e. the frequency with which the memory contents of the pRAMs can be updated). By way of example, it has been found that using a single module of 128 pRAMs it is possible to update all the pRAMs at least every 50 µs, which is faster than the response time of many biological neurons.

The steps which take place in one way of operating the module described above are as follows:

(1) Generate an input vector u for the first of the pRAMs on the basis of the connection pointers for that pRAM, as stored in the connection pointers table. The control unit 11 transforms the vector u into the corresponding address for the RAM 20, at which address the contents of the storage location are denoted as $\alpha_u$.

(2) Latch the contents of the addressed register into the data latch.

(3) Compare the data in the data latch with a random number produced by the generator 12 to produce a new output, a, (0 or 1) for the pRAM.

(4) Store the output a in a column 0 of the output list in the row relating to the pRAM.

(5) Repeat steps (1) to (4) for each pRAM in turn until all pRAMs in the module have been processed.

(6) According to the reward-penalty algorithm, process each pRAM in turn using the newly-generated outputs and the signals r and p from the environment to calculate new values for the memory contents of the pRAMs, (this is carried out by the learning block 14) and write the new values back to the corresponding memory locations of the pRAM.

(7) Send column 0 of the output lists to the four neighbouring modules via the serial output port, and transfer the data in column 0 to column 1.

The above process is executed on each of the modules synchronously and respectively. Thus, at the point where step (7) is being executed each module is not only sending column 0 of its output lists to its neighbouring modules, but is also receiving from them, via its input ports, column 0 of their output lists.

The serial output ports can be used to communicate not only with neighbouring modules but also with a host commuter, or with an interface to a system which the network controls or to which it provides information.

Step (6) above refers to a form of reinforcement training known as global reward/penalty learning, in which the contents of at least one of the storage locations in the neuron (in this case a pRAM) are altered on the basis of signals from the environment signifying success or failure of the network as a whole (the reward and penalty signals, r and p). Suitable algorithms for carrying out such reinforcement training are described in the International Patent Applications mentioned above and in a paper entitled "Reinforcement training strategies for probabilistic RAMS" by D. Gorse and J. G. Taylor in: Proceedings of Euronet '90, Prague, September 1990, pp 98–100.

Figure 4A:
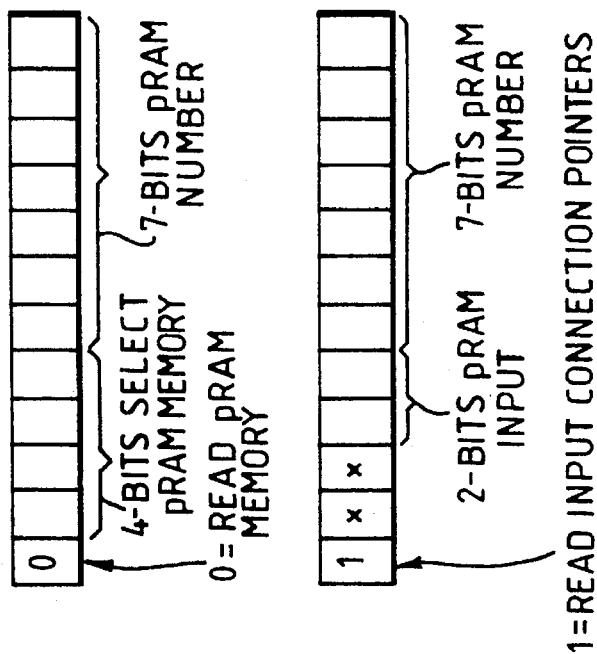
FIG. 4a shows the forms of external RAM address used for the RAM shown in FIG. 4.
Figure 4:
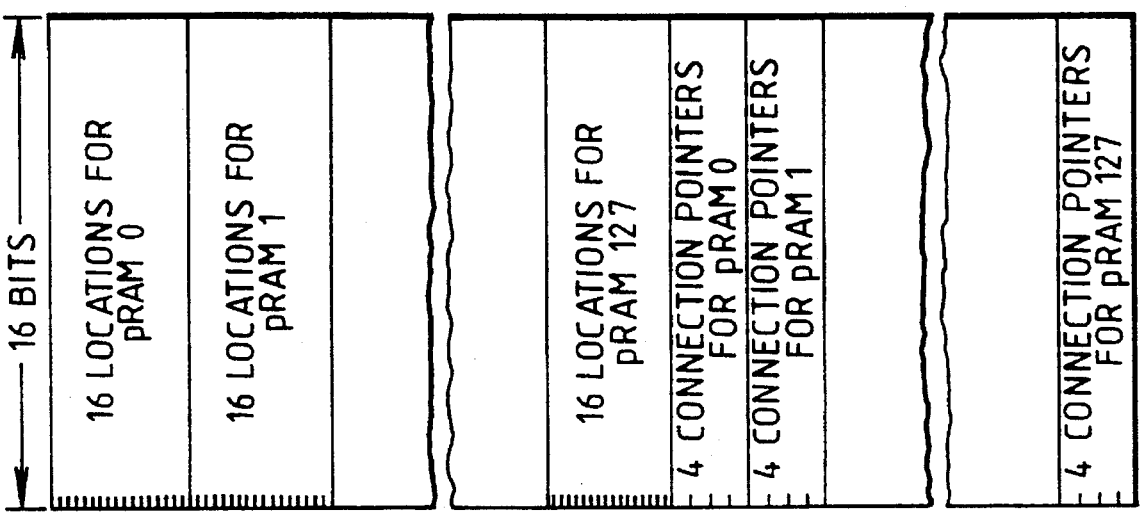
FIG. 4 shows the way in which the RAM may be organised.

To implement such reinforcement training the organisation of the RAM is as shown in FIG. 4, assuming that the connection pointer table is in the RAM. The external RAM address is then defined as shown in FIG. 4a.

Figure 5:
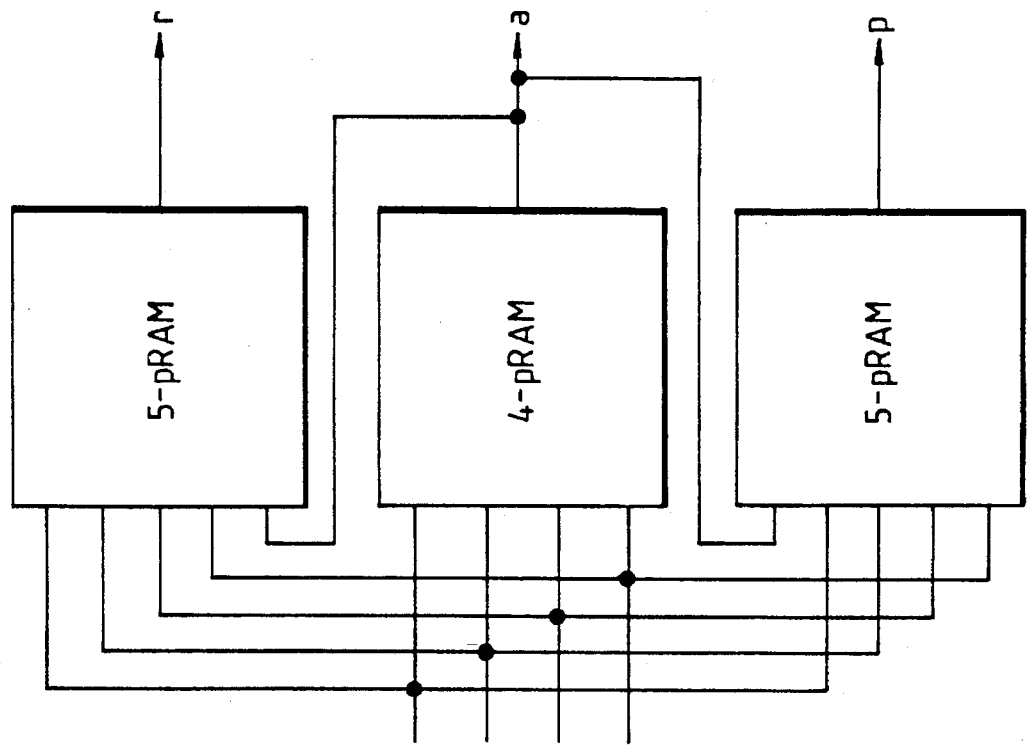
FIG. 5 shows a pRAM configuration which provides for local learning.

An alternative to global learning is local learning. The learning block 14 required for this is identical to that required for global learning, and the difference derives from the fact that whereas in global learning the inputs r and p are the same for all neurons, in local learning r and p are locally and separately generated for each neuron. One way of doing this is by using auxiliary pRAMs, and this is shown in FIG. 5. In this arrangement a pair of 5-pRAMs (i.e. pRAMs with 5 inputs) is associated with each 4-pRAM. The auxiliary pRAMs have fixed memory contents which, like the memory contents of the 4pRAMs are held in external RAM. The way in which the memory contents of the auxiliary pRAMs are chosen is similar to the basis used for the i-pRAMs discussed in the above mentioned International Patent Applications and in the Euronet '90 paper mentioned above. The output of the auxiliary pRAMs are the signals r and p.

The process of updating the pRAM memory using this form of learning closely resembles that for the global reward-penalty learning pRAM except for step (6). Since local learning does not depend on the performance of the whole net, the learning procedure can be performed locally as each pRAM is processed. In this case, step (6) will normally be performed between steps (4) and (5) as this is a more efficient method. Thus the pRAM memory is updated whilst the current $\alpha_u$ and a (the pRAM output) are valid.

Figure 6:
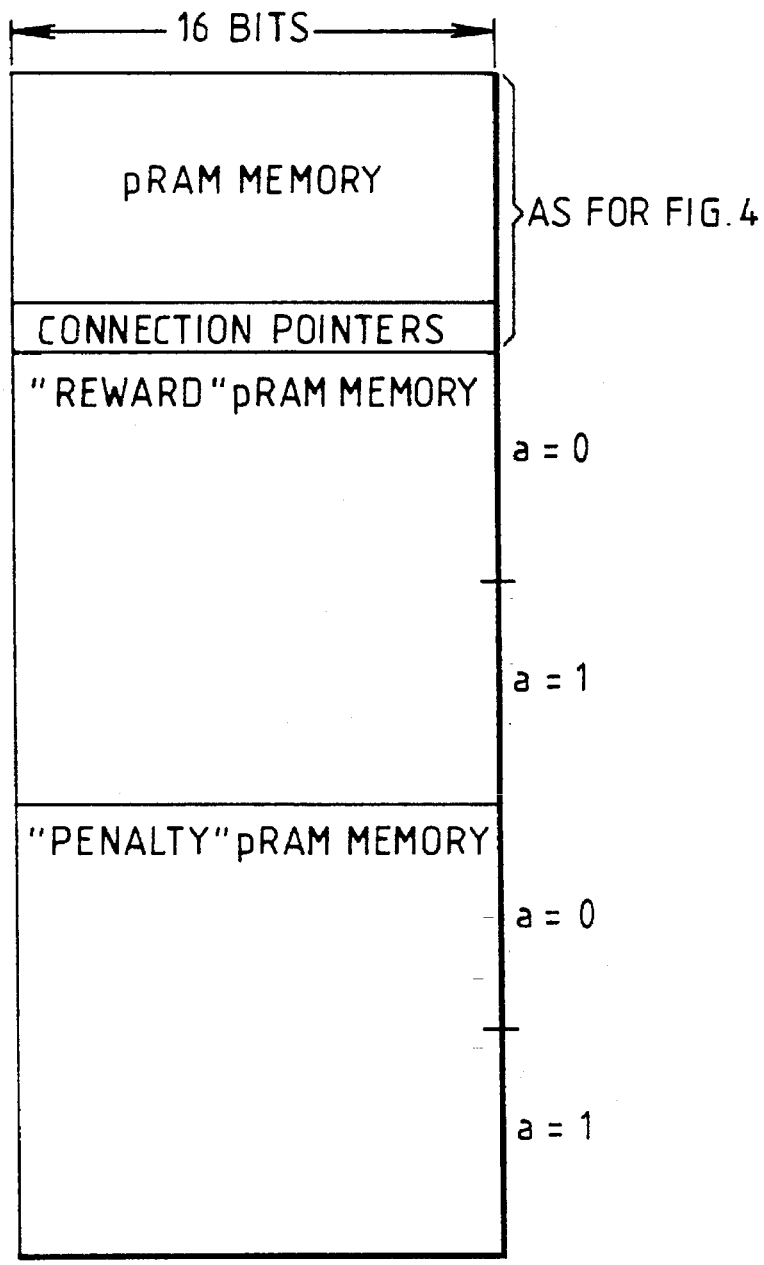
FIG. 6 shows the way in which the RAM may be organised to allow for the local learning of FIG. 5.
Figure 6A:
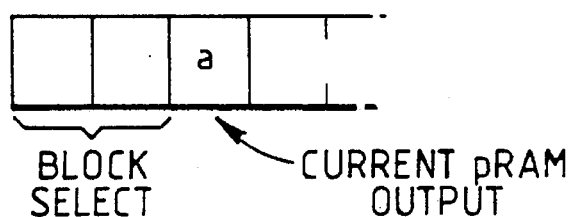
FIG. 6a shows a modification of the external RAM address to cater for the RAM organisation of FIG. 6.

The use of local learning requires some alteration to the organisation of the RAM compared to that used for global learning. The auxiliary pRAMs each require twice as much memory as the pRAMs they serve; one set of data for a=0 (pRAM not firing) and another set when a=1 (pRAM firing). This is shown in FIG. 6. Also, extra bits are required on the address bus to select 'r' and 'p' memory, e.g. as shown in FIG. 6a. The block select bits may for example be:

00 - pRAM memory
01 - reward pRAM memory
10 - penalty pRAM memory

Other forms of learning may be used instead of reward/penalty learning (either global or local). For example, use may be made of gradient descent, back-propagation, Kohonen topographic maps and Hebbian learning, all of which are established techniques in the field of neural networks.

Various other modifications may also be made to the operating process described above. For example, the output of each pRAM can be transmitted to the neighbouring pRAM modules as soon as it is generated, rather than (as in step 7 described above) have a separate step in which the outputs of all the pRAMs in a module are transmitted. If this is done, however, extra RAM storage for copies of column 0 in the output list must be provided in this and neighbouring modules.

It is emphasised that, as already mentioned, the architecture of the present invention is of general application in neural networks, and is not restricted to those where the neurons are pRAMS. This architecture is also applicable when a learning module is not present.

I claim:

1. A neural network comprising a first module and a plurality of further modules, each respective one of the further modules being connected directly to the first module by a connection whose ends are at the first module and the respective further module, each of the modules having a plurality of neurons, and each of the modules comprising a memory providing a plurality of storage locations for each of the neurons, and, in an integrated circuit, means for defining an algorithm for operation of the neurons and a control unit for causing the neurons to produce outputs on the basis of data stored in the storage locations and the algorithm, each of the modules further comprising a connection pointers table defining which neuron outputs or external inputs are connected to which neuron inputs.

2. A network according to claim 1, wherein, in each module, the integrated circuit is distinct from the memory.

3. A network according to claim 1, wherein in each module, the integrated circuit further defines a learning algorithm by means of which the neurons can undergo a learning process.

4. A network according to claim 1, wherein each module comprises an output list which holds current outputs of the neurons of the module, and a further output list which holds previous outputs of the neurons of the module and the previous outputs of the neurons of the other modules to which it is connected.

5. A network according to claim 4, wherein the output lists are held in the memory.

6. A network according to claim 4, wherein the output lists are held in the integrated circuit.

7. A network according to claim 1, wherein, in each module, the connection pointers table is held in the memory.

8. A network according to claim 1, wherein, in each module, the connection pointers table is held in the integrated circuit.

9. A network according to claim 1, wherein, in each module, the means defining the neuron algorithm comprises a random number generator and a comparator for comparing the contents of the storage locations with random numbers produced by the random number generator, the comparator having an output at which appears a signal having a first or second value depending on the result of the comparison, the comparator outputs constituting the neuron outputs.

* * * * *